(12) United States Patent
Shooshtari et al.

(10) Patent No.: US 8,708,163 B2
(45) Date of Patent: *Apr. 29, 2014

(54) SPUNBOND POLYESTER FIBER WEBS

(75) Inventors: Kiarash Alavi Shooshtari, Littleton, CO (US); James Patrick Hamilton, Horseheads, NY (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 592 days.

This patent is subject to a terminal disclaimer.

(21) Appl. No.: 12/969,156

(22) Filed: Dec. 15, 2010

(65) Prior Publication Data
US 2012/0152825 A1 Jun. 21, 2012

(51) Int. Cl.
*C08G 73/00* (2006.01)
*B01D 24/00* (2006.01)

(52) U.S. Cl.
USPC .............. 210/508; 210/503; 525/7.3; 525/21; 525/22; 525/33; 525/35; 442/327; 528/224; 528/227; 528/229; 528/367; 528/369

(58) Field of Classification Search
USPC ........... 210/503, 508; 525/7.3, 21, 22, 33, 35; 442/327; 528/224, 227, 229, 367, 369
See application file for complete search history.

(56) References Cited

U.S. PATENT DOCUMENTS

| 1,801,053 | A | 4/1931 | Meigs |
| 4,206,097 | A * | 6/1980 | Drawert et al. ............. 525/420.5 |
| 7,655,711 | B2 | 2/2010 | Swift et al. |
| 7,772,347 | B2 | 8/2010 | Swift et al. |
| 7,807,771 | B2 | 10/2010 | Swift et al. |
| 7,888,445 | B2 | 2/2011 | Swift et al. |
| 2005/0279695 | A1* | 12/2005 | Straeffer et al. ............. 210/335 |
| 2007/0027283 | A1* | 2/2007 | Swift et al. .................... 527/312 |
| 2008/0274291 | A1* | 11/2008 | Shooshtari ................. 427/389.8 |
| 2009/0324915 | A1 | 12/2009 | Swift et al. |
| 2010/0084598 | A1 | 4/2010 | Jackson et al. |
| 2010/0086728 | A1 | 4/2010 | Theurl et al. |

FOREIGN PATENT DOCUMENTS

| DE | 19 05 054 A1 | 8/1969 |
| DE | 43 08 089 A1 | 9/1994 |
| EP | 1 510 607 A1 | 3/2005 |
| WO | 2007014236 A2 | 2/2007 |

* cited by examiner

*Primary Examiner* — Krishnan S Menon
*Assistant Examiner* — Allison Gionta Fitzsimmons
(74) *Attorney, Agent, or Firm* — Robert D. Touslee

(57) ABSTRACT

Provided are spunbond polyester mats using an improved curable composition. The curable composition comprises a reaction product of an amine and a reactant in the form of an amino-amide intermediate. To the amino-amide is added an aldehyde or ketone to form the curable binder composition. The composition when used as a binder in the mat is cured to form a water-insoluble binder which exhibits good adhesion and thermodimensional stability.

20 Claims, 2 Drawing Sheets

SPUNBOND POLYESTER FIBER WEBS

BACKGROUND

The subject invention pertains to spunbond polyester mats with an improved binding composition and improved tear strength and elongation properties. More specifically, the invention pertains to a spunbond polyester mat using an improved curable composition comprising an addition product of an amine and a saturated or unsaturated reactant in the form of a amino-amide intermediate. An aldehyde or ketone is added to the amino-amide to form a composition which upon curing forms a water-insoluble polymer composition.

Spunbond polyester nonwovens are known and commercially available. The unique technology process creates products with the excellent properties of a uniform surface, tear strength and high porosity. Polyester spunbond is a manufactured sheet of randomly oriented polyester filaments bonded by calendaring, needling, chemically with a binder, or a combination of these methods. In general, small diameter filaments are formed by extruding one or more molten polyester fibers from a spinneret. The extruded fibers are cooled while being drawn to form spunbond fibers or continuous filaments, which are deposited or laid onto a forming surface in a random manner to form a loosely entangled web. This web is then subjected to a bonding process.

When a binder is used thermosetting binders are employed as bonding agents in curable polyester spunbond mats for reinforcement applications. Generally, latex binders have been employed to bind polyester fibers. These latex binders are crosslinked via several mechanisms including formation of ester, ether, alkyl, epoxy and urethane linkages. Most latex binders are crosslinked via addition of a formaldehyde based crosslinker. Since formaldehyde is a known respiratory and skin irritant as well as a suspected carcinogen, it is desirable to eliminate formaldehyde based binders from the manufacturing process for these products. While other formaldehyde free binders are available to produce spunbond products, these binders typically result in reduced physical performance or greater difficulty in processing the mat. Thus, it is highly desirable to have a mat binder that does not contain formaldehyde in its formulation or a binder that produces or generates formaldehyde in the curing or crosslinking step. Such a binder should process easily and demonstrate equivalent performance to formaldehyde-based binders. Although existing binders provide adequate tensile and tear strength to the spunbond mat, thermal dimensional stability (TDS) requirements at temperatures above 180° C. can not be met and as a result, fiberglass scrim reinforcement is often required.

Accordingly, in one aspect the present invention provides a novel spunbond polyester mat comprised of a binder which is free of formaldehyde.

Another aspect of the invention provides a novel spunbond polyester mat with a formaldehyde free binder that processes easily and provides at least comparable tensile and tear strength to the mat.

Still another aspect of the present invention is to provide a spunbond polyester mat which uses a suitable binder having improved economics, while also enjoying improved thermal dimensional stability.

These and other aspects of the present invention will become apparent to the skilled artisan upon a review of the following description and the claims appended hereto.

SUMMARY OF THE INVENTION

Provided is a spunbond polyester mat. The binder is a curable composition comprising the reaction product of an amine and a reactant in the form of an amino-amide intermediate. To this intermediate is added an aldehyde or ketone, preferably a reducing sugar, to form the curable binder composition. This composition upon curing forms a water-insoluble binder.

A process for preparing spunbond web of polyester fibers is also provided, comprising applying to the spunbond polyester fibers a coating of a composition comprising an addition product of an amine and a reactant in the form of an amino-amide intermediate, to which is added an aldehyde or ketone. Thereafter the composition is cured while present as a coating on the polymeric fibers to form a water-insoluble polymer.

In one embodiment, the amino-amide intermediate is first heated to create an oligomer. The aldehyde or ketone is added to the oligomer. This composition is added to the polymeric fibers as a binder and cured.

In a preferred embodiment the resulting spunbond polyester mat is used as a filter or in a roofing membrane.

DETAILED DESCRIPTION OF PREFERRED EMBODIMENTS

Figure 1:
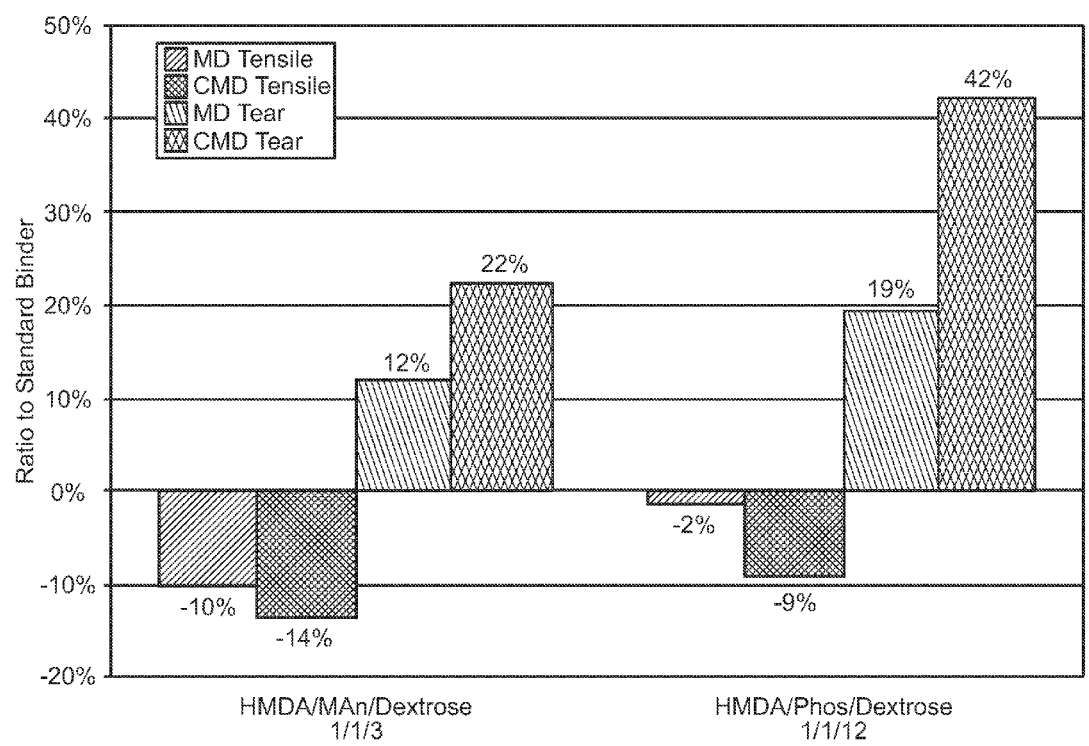
FIG. 1 shows the machine and cross-machine direction tensile and tear strength of HMDA/MAn/Dextrose expressed as a ratio to a standard latex binder system.

Spunbond polyester nonwovens are known. Spunbond polyester webs or mats can be used in many applications, particularly in roofing membranes and filters. The webs or mats can be used in any roofing application, e.g., in a flat roof, pitched rood or shingles. The filters can be for air filtration, liquid filtration and in a mist eliminator for sub-micron particles. The spunbond polyester webs or mats can also be utilized in flooring applications, wallcoverings, deco and technical yarns, geotextiles, the automotive industry, for heat absorption applications, insulation and lamination, pipewrap as well as batteries.

In general, spunbound polyester mats are prepared by extruding polyester polymers into continuous filament strands that are arranged uniformly in multiple layers, using an overlapping pattern to give the mat dimensional strength. A binder is added to the continuous filament strands to help strength and maintain integrity of the mat.

The binder of the present invention which is employed to prepare the polyester spunbond mat is a curable composition comprising the reaction product of an amine and a reactant in the form of a amino-amide intermediate.

In accordance with one embodiment of the invention, amine reactants are selected which are capable of undergoing addition to form the requisite amino-amide, which forms a water-insoluble polyimide upon curing. In such an embodiment the amine is a di- or multi-functional primary or secondary amine. More preferably the amine is a diamine having at least one primary amine group.

Examples of amines include but are not limited to aliphatic, cycloaliphatic and aromatic amines. The amines may be linear or branched. The amine functionalities may be di- or multifunctional primary or secondary amines.

Representative amines that are suitable for use in such an embodiment include 1,2-ethylenediamine, 1,3-propanediamine, 1,4-butanediamine, 1,5-pentanediamine, 1,6-hexanediamine, α,α-diaminoxylene, diethylenetriamine, triethylenetetramine, tetraethylenepentamine, and mixtures of these. Preferred diamines for use in this embodiment of the invention are 1,4-butanediamine and 1,6-hexanediamine. Natural and synthetic amino acids such as lysine, arginine, histidine, etc. can also be used.

The curable amino-amide is formed through the selection of a saturated or unsaturated reactant that is an anhydride, carboxylic acid, ester, and salts or mixture of such reactants. Representative unsaturated reactants are maleic acid, fumaric acid, maleic anhydride, mono- and di-esters of maleic acid and fumaric acid, and salts and mixtures of these. Ammonium salts of the unsaturated acids of their monoesters conveniently can be utilized. A preferred unsaturated reactant for use is maleic anhydride. Representatives of suitable saturated reactant include, but are not limited to, succinic anhydride, succinic acid, mono and diesters of succinic acid, glutaric acid and anhydride, phthalic acid and anhydride, tetrahydro phthalic acid and anhydride, mono and diesters of acid anhydrides and salts of the acids and their mono esters. Examples of preferred saturated reactants are phthalic anhydride and tetrahydro phthalic anhydride.

In one embodiment, the amino amide is a reaction product of a diamine, such as 1,6 hexanediamine, and an anhydride such as maleic anhydride.

The amino-amide addition products can be readily formed by mixing the components in an aqueous medium at room temperature. The resulting addition products are either water-soluble, water-dispersible, or are present as an emulsion. The amino-amide contains an amic acid function, as well as an amine function. A distinct advantage is obtained by having all three functions, i.e., amine, amide, and carboxylic acid, on the same molecule.

To the solution of amino-amide, the carbonyl functional materials can be added, especially an aldehyde or ketone. Due to their higher reactivity, aldehydes are preferred to ketones. Examples of suitable aldehydes include, but are not limited to, mono- and multifunctional aldehydes including acetaldehyde, hydroxyl acetaldehyde, butyraldehyde, acrolein, furfural, glyoxal, glutaraldehyde, glataraldehyde, polyfurfural, poly actrolein, copolymers or acrolein and others. Reducing mono and polysaccharides such as glucose, maltose, celobiose etc. can be used, with reducing monosaccharides such as glucose being preferred.

Examples of ketones include, but are not limited to, acetone, acetyl acetone, 1,3 dihydroxy acetone, benzyl, bonzoin, fructose, etc.

The aldehydes and ketones react with the amino-amide, which contains an amic acid function, i.e., an amide linkage in the vicinity of a carboxylic acid. An amic acid function is more reactive than a simple carboxylic acid. The amount of aldehyde and/or ketone added is generally such that the molar ratio of acid in the amino-amide to carbonyl or ketone is from 1:50 to 50:1. A ratio of 1:20 to 20:1 is more preferred, with a ratio of 1:10 to 10:1 being even more preferred, and a ratio of 1:3 to 1:8 being most preferred.

One advantage is that the presence of all functional groups, i.e., amine, amide and carboxylic acid, on the same molecule eliminates the potential need for the addition of external crosslinkers or binders such as polycarboxylic acids and/or polyvinyl alcohol. Such crosslinkers can be added, however if desired. Also, a high crosslink density is achieved which results in higher resistance to moisture and an increase in the softening point of the cured binder. In addition, the presence of all reactive functionalities on the same molecule will ensure the absence of any unreacted small molecule leftover from the original crosslinker.

In an embodiment, the amino-amide can be first oligomerized prior to adding the aldehyde or ketone. The amino-amide can be heated until an oligomer is obtained, e.g., a dimer, trimer or tetramer of the amino-amide intermediate. An example of suitable conditions for making the oligomer involves heating in the range of from 120-150° C. for up to 5 hours.

Using the oligomerized product has been found to result in a more robust binder product upon curing. This manifests itself in the strength of the binder, and allows for better storage results, higher tensile strength and rigidity and better recovery of products made with the binder.

The binder composition when applied to the spunbond polyester fibers optionally can include adhesion prompters, oxygen scavengers, solvents, emulsifiers, pigments, fillers, anti-migration aids, coalescent aids, wetting agents, biocides, plasticizers, organosilanes, anti-foaming agents, colorants, waxes, suspending agents, anti-oxidants, crosslinking catalysts, secondary crosslinkers, and combinations of these.

Among the catalysts are salts of strong acids, either organic or inorganic, with salts of inorganic acids such as phosphoric acid, sulfuric acid, nitric acid and halogenated acid being preferred. These suitable catalysts include sodium or ammonium phosphate, sodium or ammonium sulfate, sodium or ammonium nitrate and sodium or ammonium chloride. The catalyst generally comprises from 2 to 8 wt % of the total binder composition, and more preferably from 4 to 6 wt % of the total binder composition.

The binder composition of the present invention can be coated on the spunbond polyester fibers by a variety of techniques. In preferred embodiments these include spraying, spin-curtain coating, and dipping-roll coating. The composition can be applied to freshly-formed polyester fibers or continuous filaments, or to the polyester fibers or filaments following collection. Water or other solvents can be removed by heating.

Thereafter the composition undergoes curing wherein a binder is formed which exhibits good adhesion to the polyester fibers. The polymeric composition obtained upon curing contains a combination of a polyamino-amide and a polyamino-imide. The polyimide is the primary product, but some of the amide in the intermediate is believed to not form the imide. Thus, some polyamino-amide is also present in the cured composition binder.

Such curing can be conducted by heating. Elevated curing temperatures on the order of 100 to 300° C. generally are acceptable, but below the melting temperature of the polymeric fibers. Satisfactory curing results are achieved by heating in an air oven at 200° C. for approximately 20 minutes.

The cured binder at the conclusion of the curing step commonly is present as a secure binder in a concentration of approximately 0.5 to 50 percent by weight of the polymeric fibers, and most preferably in a concentration of approximately 1 to 25 percent by weight of the polymeric fibers.

The present invention provides a formaldehyde-free route to form a securely bound formaldehyde-free polyester spunbond mat. The binder composition of the present invention provides advantageous flow properties, the elimination of required pH modifiers such as sulfuric acid and caustic, and improved overall economics and safety. The binder also has the advantages of being stronger and offering lower amounts of relative volatile organic content during curing, which ensures a safer work place and environment. The cure time of the binder is also faster and therefore does favor the economics while reducing the energy consumption during the curing process and lowering the carbon footprint. The binder also contains a high level of sustainable raw materials further reducing the dependency to fossil based sources for the resin. Due to the hydrophobic nature of the present invention, the need for a water repellant such as silicones is eliminated or greatly reduced.

The following examples are presented to provide specific examples of the present invention. In each instance the thin glass plate substrate that receives the coating can be replaced by spunbond polyester continuous filaments or fibers. By applying the binder in the examples to spunbond polyester continuous filaments or fibers, an improved mat can be achieved. It should be understood, however, that the invention is not limited to the specific details set forth in the Examples.
Formation of Amino-Amide Intermediates:

To 1160 g of 1,6 hexanemethyldiamine (HMDA) dissolved in 2140 g water, 980 g maleic anhydride (MAn) was added slowly (molar ratio of 1:1) and the solution was stirred for 10 min. The intermediate was labeled HM.

To 1160 g of HMDA dissolved in 2640 g water was added 1480 g phthalic anhydride. After the anhydride dissolved, the intermediate was labeled HPh.

To 1160 g of HMDA dissolved in 2680 g water was added 1520 g tetrahydro phthalic anhydride. The solution was stirred until all anhydride dissolved. The intermediate was labeled HT.

These intermediates were utilized to make the following binder resins with glucose.

EXAMPLE 1

To 42.8 g of solution of HM intermediate, anhydrous dextrose (alpha-D-glucose) and water was added. The mass of added water was chosen to be equal to that of the corresponding dextrose. The mass of dextrose (and corresponding water) used was 18 g, 36 g, 54 g, 72 g, 90 g, 108 g, 144 g, 180 g and 216 g. The various solutions were stirred at ambient temperature for 10 min. The solutions were applied as thin film on a glass and Al panel, dried in an oven at 100° C. for 5 min and cured at 200° C. for 20 min. Each film gave a cured brown polymer that was hard and insoluble in water and solvents.

EXAMPLE 2

To 52.8 g of solution of HPh intermediate, anhydrous dextrose and water was added. The mass of added water was chosen to be equal to that of the corresponding dextrose. The mass of dextrose (and corresponding water) used was 18 g, 36 g, 54 g, 72 g, 90 g, 108 g, 144 g, 180 g and 216 g. The various solutions were stirred at ambient temperature for 10 min. The solutions were applied as a thin film on a glass and Al panel, dried in an oven at 100° C. for 5 min and cured at 200° C. for 20 min. Each solution gave a cured brown polymer that was hard and insoluble in water and solvents.

EXAMPLE 3

To 53.6 g of solution of HT intermediate anhydrous dextrose and water was added. The mass of added water was chosen to be equal to that of the corresponding dextrose. The mass of dextrose (and corresponding water) used was 18 g, 36 g, 54 g, 72 g, 90 g, 108 g, 144 g, 180 g and 216 g. The various solutions were stirred at ambient temperature for 10 min. The solutions were applied as a thin film on a glass and Al panel, dried in an oven at 100° C. for 5 min and cured at 200° C. for 20 min. Each solution gave a cured brown polymer that was hard and insoluble in water and solvents.

EXAMPLE 4

Examples 1-3 were repeated in the presence of 5% by weight ammonium sulfate. The polymers became insoluble in water in less than 10 min.

EXAMPLE 5

To 116 g of HMDA dissolved in 214 g water was added slowly 98 g maleic anhydride (MAn), this was a molar ratio of 1:1. The resulting solution was refluxed for 60 minutes to prepare an amino-amide oligomer. The solution was opaque with 50% solids. The solution was then used to repeat example 2 with the observed results being the same, i.e., the cured polymer was hard and insoluble in water solvents.

EXAMPLE 6

Example 5 was repeated in the presence of 5% by weight ammonium sulfate. The polymers became insoluble in water in less than 10 min.

EXAMPLE 7

Plant Trial

In a non-limiting example, a dextrose-based binder was applied to a polyester spunbond mat for evaluation of physical properties. The binder included in this example has a composition of hexamethylenediamine/maleic anhydride/dextrose (HMDA/MAn/Dextrose) in which the molar equivalent ratios between each component are 1/1/3. The binder was diluted with tap water and applied to a spunbond mat via a dip-and-squeeze coating application. The coated mat was dried and cured in a standard convection oven set at 215° C.

The polyester spunbond mat tensile and trap tear strengths were measured at room temperature in both the machine and cross-machine directions at room temperature using a standard Instron. The results are shown in FIG. 1. The binder system yielded comparable tensile strength and improved tear strength in comparison to a standard latex binder system.

Figure 2:
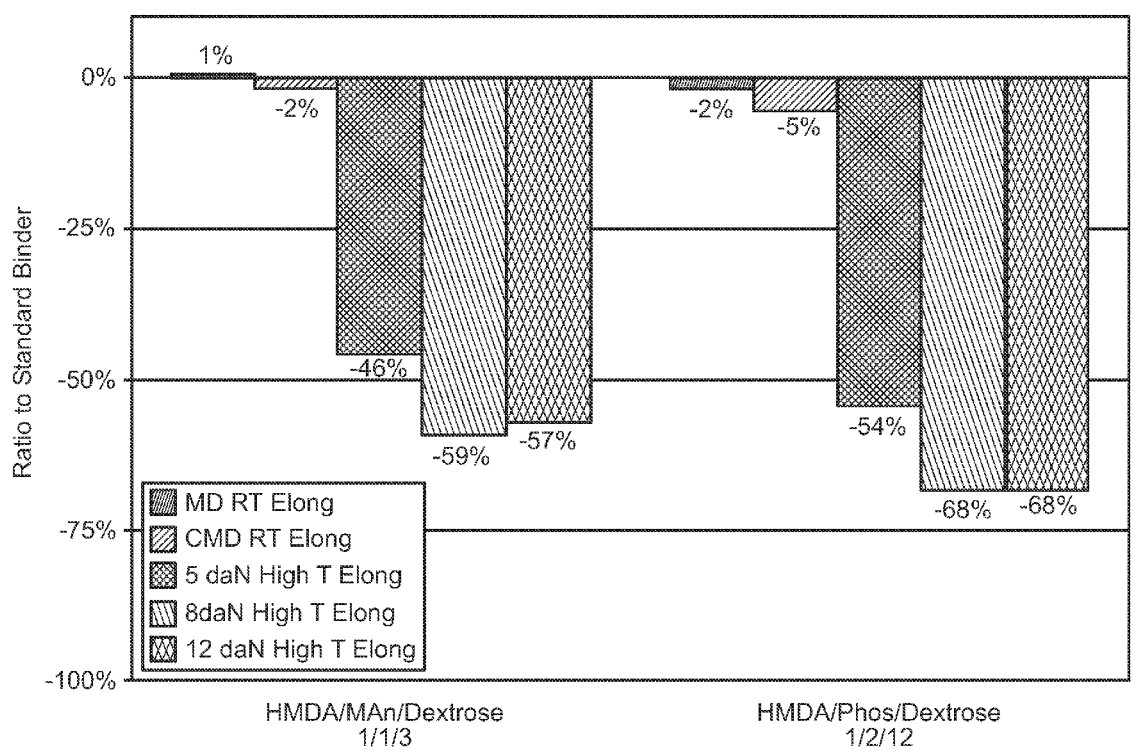
FIG. 2 shows the machine and cross-machine direction tensile elongation and elevated temperature relative tensile elongation of a HMDA/MAn/Dextrose binder expressed as a ratio to a standard latex binder system. The MD and CMD tensile elongation tests were conducted at room temperature. The relative tensile elongation tests were conducted at 200° C. and the absolute elongation is determined at tensile loadings of 5, 8, and 12 daN, respectively.

The elongation of the spunbond mat was also measured at both room temperature and elevated (200° C.) temperature, with results being shown in FIG. 2. In the room temperature test, % tensile elongation in both the machine and cross-machine directions is determined at the maximum tensile loading. The elevated temperature % tensile elongation is determined at tensile loadings of 5, 8, and 12 daN, respectively. The binder system yielded 50-60% improvement in tensile elongation at elevated temperature while providing comparable tensile elongation at room temperature in comparison to a standard latex binder system. The overall performance of the binder is superior to any commercially available thermoplastic latex or formaldehyde-free thermosetting binder system and has the added advantage of being primarily derived from renewable raw materials.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes That which is claimed is:

1. A spunbond polyester mat comprising a binder comprised of a reaction product of an aldehyde or ketone with an amino-amide, which is a reaction product of a diamine and an unsaturated or saturated reactant, with the reactant selected from the group consisting of saturated and unsaturated anhydrides, carboxylic acids, esters, inorganic acids, salts and mixtures of these.

2. The spunbond polyester mat of claim 1, wherein the diamine has at least one primary amine group.

3. The spunbond polyester mat of claim 2, wherein said diamine is selected from the group consisting of ethylene diamine, 1,3-propanediamine, 1,4-butanediamine, 1,5-pentanediamine, 1,6-hexanediamine, α,α-diaminoxylene, diethylenetriamine, triethylenetetramine, tetraethylenepentamine, and mixtures thereof.

4. The spunbond polyester mat of claim 2, wherein said unsaturated reactant is selected from the group consisting of maleic acid, fumaric acid, maleic anhydride, itaconic acid, itaconic anhydride mono- and di-esters of maleic acid, mono- and di-esters of fumaric acid, and salts and mixtures thereof.

5. The spunbond polyester mat of claim 2, wherein said unsaturated reactant is maleic anhydride.

6. The spunbond polyester mat of claim 1, wherein an aldehyde is reacted with the amino-amide.

7. The spunbond polyester mat of claim 6, wherein the aldehyde is a reducing sugar.

8. The spunbond polyester mat of claim 7, wherein the aldehyde is glucose.

9. The spunbond polyester mat of claim 1, wherein the binder is cured.

10. The spunbond polyester mat of claim 1, with the binder further comprising at least one component selected from the group consisting of adhesion promoters, oxygen scavengers, moisture repellants, solvents, emulsifiers, pigments, fillers, anti-migration aids, coalescent aids, wetting agents, biocides, plasticizers, organosilanes, anti-foaming agents, colorants, waxes, suspending agents, anti-oxidants, and crosslinking catalysts.

11. The spunbond polyester mat of claim 1, wherein the amino-amide is an oligomer.

12. A method for preparing a spunbound polyester mat, comprising the step of coating polyester fibers or continuous filaments with a binder composition comprised of a reaction product of an aldehyde or ketone with an amino-amide, which is a reaction product of an diamine and a reactant selected from the group consisting of saturated and unsaturated anhydride, carboxylic acids, esters, inorganic acids, salts and mixtures thereof.

13. The method of claim 12, wherein the reactant is an anhydride.

14. The method of claim 13, wherein the diamine is 1,6-hexanemethyldiamine and the reactant is maleic anhydride.

15. The method of claim 12, wherein the amino-amide is an oligomer.

16. The method of claim 12, further comprising curing the binder composition.

17. The method of claim 12, wherein the binder composition further comprises a salt of a strong acid as a catalyst.

18. The spunbound polyester mat of claim 1, wherein the mat is a filter.

19. The spunbound polyester mat of claim 1, wherein the mat is a battery separator.

20. The spunbound polyester mat of claim 1, wherein the mat is used in a roofing membrane.

* * * * *